United States Patent

Goedderz

[11] Patent Number: 5,237,741
[45] Date of Patent: Aug. 24, 1993

[54] APPARATUS FOR FITTING A FLEXIBLE STRIP

[75] Inventor: Dieter Goedderz, Erkelenz, Fed. Rep. of Germany

[73] Assignee: Draftex Industries Limited, Edinburgh, Scotland

[21] Appl. No.: 818,636

[22] Filed: Jan. 6, 1992

[30] Foreign Application Priority Data

Jan. 30, 1991 [GB] United Kingdom ............... 9102042

[51] Int. Cl.$^5$ ............................................. B23P 19/00
[52] U.S. Cl. ....................................... 29/819; 29/709; 29/235; 901/41
[58] Field of Search ............... 29/819, 820, 779, 780, 29/782, 235, 897.2, 505, 709, 710, 720; 901/30, 41

[56] References Cited

U.S. PATENT DOCUMENTS

| 4,996,756 | 3/1991 | Bright et al. | 29/243.58 |
| 5,068,952 | 12/1991 | Hennen | 29/235 |
| 5,121,532 | 6/1992 | Massie | 29/235 |

FOREIGN PATENT DOCUMENTS

| 0253599 | 1/1988 | European Pat. Off. . |
| 3541865 | 6/1987 | Fed. Rep. of Germany . |
| 2626805 | 11/1989 | France . |
| 2642691 | 10/1990 | France . |
| 3003734 | 1/1991 | Japan . |
| 2227779 | 8/1990 | United Kingdom . |
| 2279702 | 10/1990 | United Kingdom . |

Primary Examiner—Mark Rosenbaum
Assistant Examiner—S. Thomas Hughes
Attorney, Agent, or Firm—Leydig, Voit & Mayer

[57] ABSTRACT

A robot hand is disclosed for fitting a length of channel-shaped sealing strip to a flange running around the door opening of a motor vehicle body. The sealing strip, with the sides of its channel initially splayed apart, is held coiled in a cassette. A take-up roller is initially driven by a motor to pull a length of the strip out of the cassette until its end engages the flange, rollers confining the strip to move in a curved path. A cradle carrying these rollers is then transversely moved clear of the path by piston-cylinder assemblies. The robot hand is then caused to travel around the door opening, the motor now rotating two parallel-axis rollers spaced either side of the flange. The latter press the sides of the channel of the sealing strip into gripping engagement with the flange and also drive the robot hand around the door opening.

22 Claims, 10 Drawing Sheets

APPARATUS FOR FITTING A FLEXIBLE STRIP

BACKGROUND OF THE INVENTION

The invention relates to apparatus for fitting a flexible strip. For example, the strip may be a sealing strip which is required to be fitted around a door or other closable opening on a motor vehicle body.

BRIEF SUMMARY OF THE INVENTION

According to the invention, there is provided a robot arrangement for fitting a length of channel-shaped strip onto a mounting flange or the like, where the side walls of the channel are initially splayed apart, comprising mounting means, means on the mounting means for supporting the sealing strip with its side walls initially splayed apart and so that the sealing strip is longitudinally movable, constraining means on the mounting means and defining a predetermined curved path having an input end and a distal end, the input end being positioned to receive an initial part of the length of the strip which follows the curved path as the strip moves longitudinally in such a manner that the mouth of the channel faces outwardly of the curved path, supporting means for positioning the mounting means in juxtaposition with the flange so that the mouth of the channel of the strip emerging from the distal end of the curved path embraces the flange, at least two drive rollers mounted on the mounting means adjacent the distal end of the curved path and rotatable about parallel axes spaced apart by such distance as to receive the sealing strip between them, and a motor means on the mounting means for rotating the rollers in such predetermined directions that they draw the sealing strip longitudinally along the curved path and onto the flange, pressing the side walls into gripping engagement with the sides of the flange and driving the mounting means along the flange.

According to the invention, there is also provided a robot hand for fitting a length of channel-shaped strip onto a mounting flange around an opening on a motor vehicle body positioned in a predetermined location with reference to a vehicle body assembly track, the side walls of the channel being initially splayed apart, comprising a housing supported and positionally controlled by a robot so as to be juxtaposed with the opening on the vehicle body, means on the housing for receiving and supporting a cassette containing a predetermined coiled of length of the sealing strip matching the length of the mounting flange and the initial end of which strip protrudes from the cassette, means on the housing defining a predetermined curved path having a distal end located at a predetermined point on the flange, take-up means for receiving the initial end of the strip protruding from the cassette and driving the strip along the predetermined curved path until the initial end reaches the distal end of the curved path and with the mouth of the channel of the strip facing outwardly of the curved path so that the initial end embraces the flange at the said predetermined point, two drive rollers mounted on the housing adjacent the end of the predetermined curved path so that each frictionally engages the outside of a respective one of the splayed apart side walls of the strip, and drive means for rotating the drive rollers in such predetermined directions that their frictional engagement with the side walls of the strip pulls the sealing strip from the cassette and along the curved path and onto the flange and moves the housing along the flange, the separation between the rollers being such that they press the splayed apart side walls into gripping engagement with the flange.

Apparatus embodying the invention for fitting a sealing strip onto a motor vehicle door opening, will now be described, by way of example only, with reference to the accompanying drawings in which.

DETAILED DESCRIPTION

Figure 1:
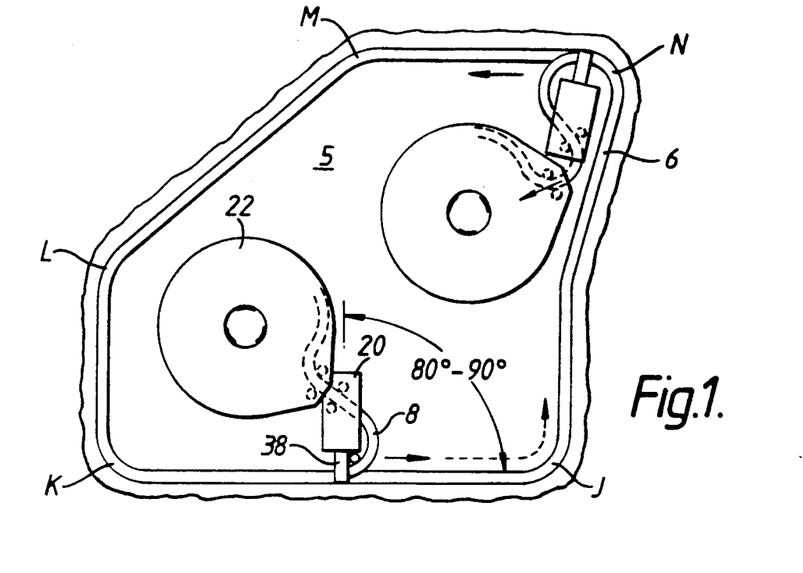
FIG. 1 is a side view of the door opening showing the apparatus in block form only.
Figure 2:
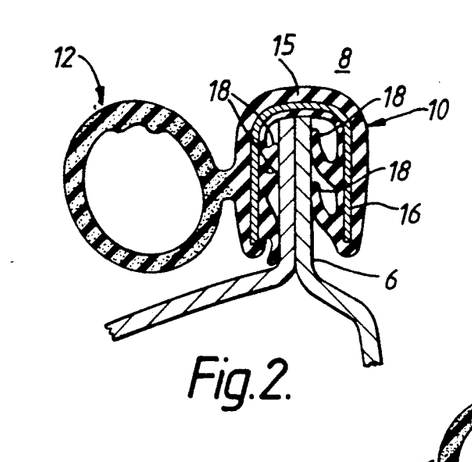
FIG. 2 is a cross-section of the sealing strip when finally fitted onto a flange surrounding the opening.

FIG. 1 shows the door opening 5 of a motor vehicle body. This door opening is defined by a flange 6 which runs around the door opening, lying generally in its plane, and which is formed where the inner and outer body panels come together, and are welded, at the door opening. In order to provide a seal for the door opening 5, the manufacture of the car body involves the fitting of a sealing strip (see FIGS. 2, 3 and 4) onto the flange 6. FIG. 2 shows a cross-section through the flange with the sealing strip 8 in position thereon. As shown, the sealing strip 8 comprises a channel-shaped gripping section 10 which, in use, embracingly grips the flange 6 and supports a soft tubular sealing section 12, so that the sealing strip runs around the door opening, with the sealing section 12 on the outside of the opening. When the door (not shown) closes onto the opening 5, it partially compresses the tubular sealing section 12 so as to form a weather-proof seal.

The gripping section 10 is of channel-shape in cross-section and (in this case) is made of extruded rubber material 15 with an embedded channel-shaped metal carrier 16. The extruded material defines gripping lips 18 and 19 which frictionally grip the opposite facing sides of the flange and help to hold the gripping section firmly in position on the flange; lip 19 is directed oppositely to the other lips to provide improved sealing.

As illustrated, the extruded material forming the gripping section 10 is integrally extruded with further extruded rubber forming the tubular sealing section 12. Instead, however, the gripping section 10 may be manufactured separately, and the tubular sealing section 12 attached to it afterwards, as by means of adhesive. In such a case, for example, the extruded material for the gripping section 10 may be plastics.

The extruded material may be extruded so that different parts have different hardness. Thus, the lips 18 and 19 may be extruded from softer material than the remainder of the channel-shaped extruded material of the gripping section 10. This relative softness helps their sealing and gripping function. The extruded material of the tubular sealing section 12 may be of foamed or cellular construction to improve sealing efficiency.

The metal carrier 16 may take any suitable form. For example, it may be made of continuous metal strip. Instead, however, it can be made of U-shaped links either connected together by short flexible connecting links or entirely separate. Another possibility is to construct the carrier from wire looped to and fro.

Figure 3:
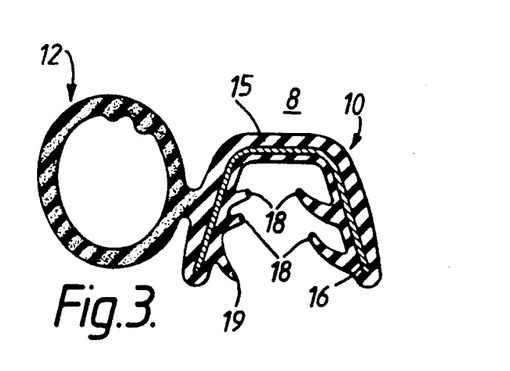
FIGS. 3 and 4 are cross-sections of the sealing strip in the form which it has before it is fitted onto the flange and when it is initially fitted onto the flange, respectively.
Figure 4:
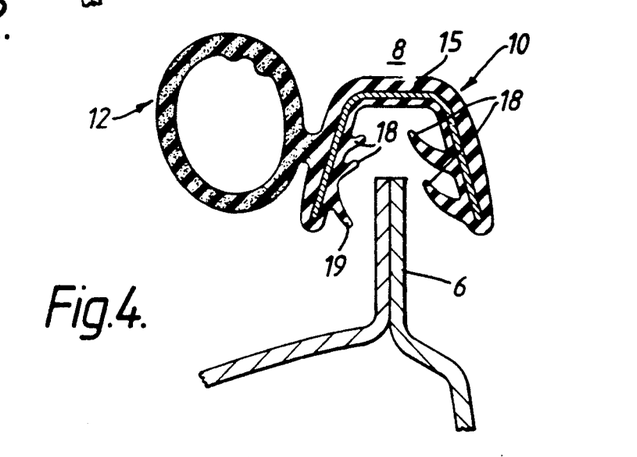

FIG. 3 shows the configuration of the sealing strip before it is fitted on the flange. It will be apparent that the sides of the channel of the gripping section 10 are splayed apart as compared with the configuration shown in FIG. 2. This splayed apart configuration facilitates the assembly of the sealing strip 8 onto the flange 6 - as shown in FIG. 4. After the sealing strip 8 has been fitted onto the flange 6 in the splayed-apart configuration shown in FIGS. 3 and 4, the splayed-apart sides of the channel are then pressed towards each other so that they assume the configuration shown in FIG. 2, firmly gripping the sides of the flange and holding the sealing strip 8 securely in position on the flange.

The apparatus and methods now to be described are concerned with the automatic fitting of the sealing strip 8 onto the flange 6, the fitting process involving the fitting of the seal 8 onto the flange in the splayed-apart configuration shown in FIGS. 3 and 4 and the subsequent step of forcing the channel walls of the gripping section towards each other to produce the result shown in FIG. 2.

The apparatus comprises several parts: a robot (not shown) having a robot arm (see FIG. 13) which carries a support assembly (illustrated in FIGS. 12 and 13), and a robot hand 20 which is fitted to the support assembly and will now be described in detail with reference to the various Figures of the drawings. FIG. 1 illustrates the robot hand 20 in block form only and shows how it carries a cassette 22 (to be described in more detail below) containing a coil of the sealing strip 8 which is fed out of the cassette by the robot hand 20 which constrains it to follow a curved path and mounts it on the flange 6, whereafter the robot hand travels along the flange and rollers, to be described in detail below, force the splayed-apart sides of the gripping section towards each other. This process would normally be carried out before the door is fitted to the body. FIG. 1 shows the robot hand 20 in two different positions and attitudes as it travels along the flange.

Figure 5:
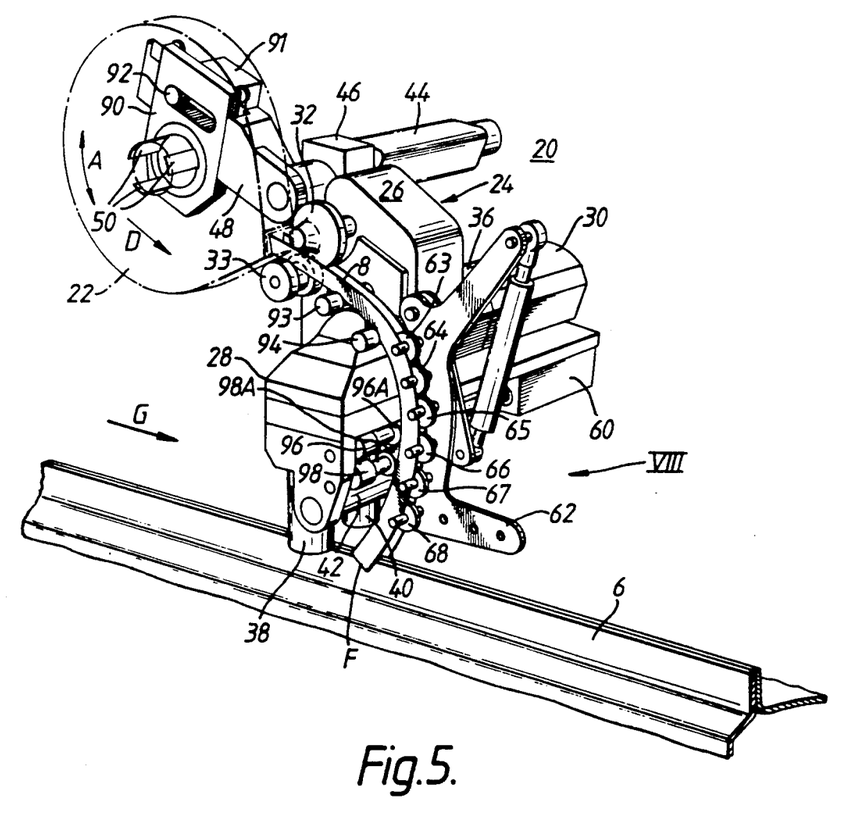
FIG. 5 is a perspective view of a robot hand forming part of the apparatus and in the state which it assumes during an initial stage in the fitting process.

Referring to FIG. 5, the robot hand 20 comprises a body indicated generally at 24. The housing 24 has a casing 26, 28 containing a gear train to be described in more detail below by means of which a motor 30 (an electrical or pneumatic rotary motor for example) can drive various rollers. One of these rollers is a take-up roller 32 which is mounted adjacent a free-running roller 33. Motor 30 is connected to drive roller 32 through a planetary gear box and the gear train (to be described below) within the casings 26 and 28. In addition, the casing 28 supports drive rollers 38 and 40 which are rotatable about vertical axes and are driven by motor 30 via the planetary gear box 36 and the gear train within housings 26 and 28. Casing 28 also supports a free-running horizontally rotatable top roller 42.

Also mounted on the housing 24 is a second motor 44. This motor, which may also be a rotary electrical or pneumatic motor, is connected through a gear box 46 for angularly moving a support arm 48 in the directions of the arrow A. Support arm 48 supports three claws 50 which engage a central boss in the cassette 22 which is shown dotted in FIG. 5. Cassette 22 may take one of the forms disclosed in published United Kingdom Patent Specification No. 2229702, though may take any other suitable form. Cassette 22 contains a coil of sealing strip 8, of the form shown in FIGS. 2, 3 and 4, there being a predetermined length of such sealing strip within the cassette, this predetermined length matching the peripheral length of the flange 6 around the door opening 5.

Figure 8:
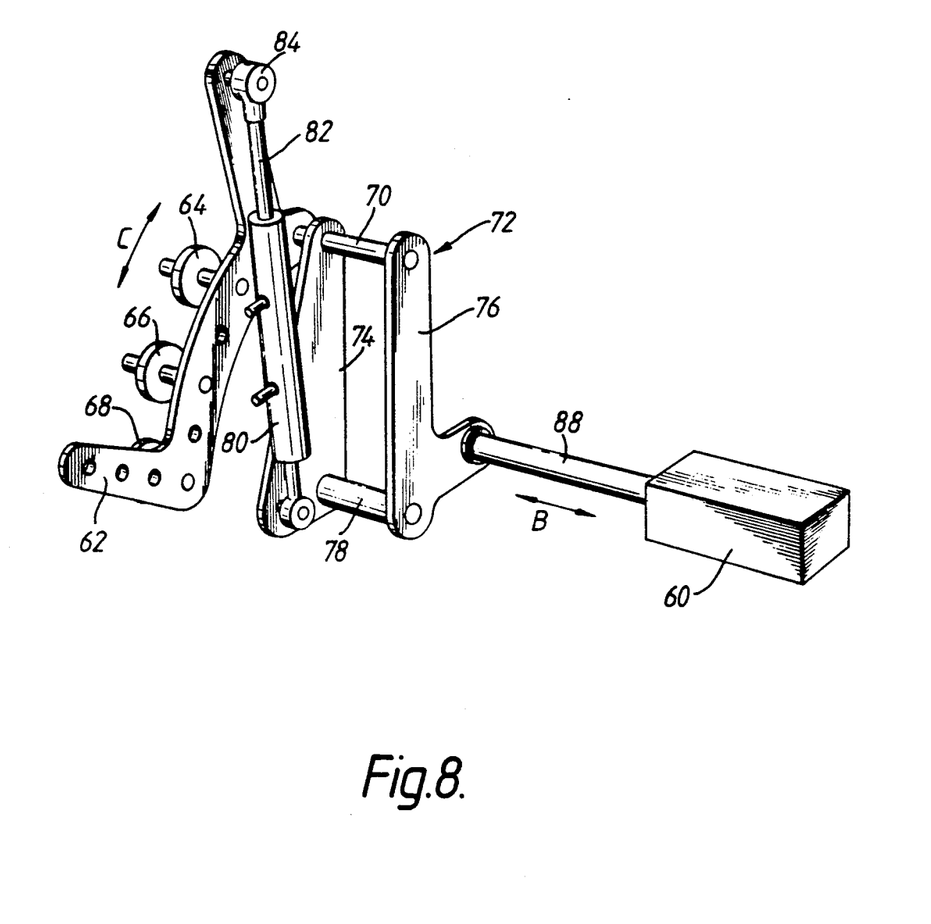
FIG. 8 shows an enlarged perspective view of part of the robot hand to illustrate part of its mechanism in greater detail.

The housing 24 also supports a pneumatic piston-cylinder assembly 60 whose piston is oval in cross-section so that it cannot rotate. The piston-cylinder assembly 60 is connected to a cradle 62 which supports six contour rollers 63 to 68. FIG. 8, which is a part view looking generally in the direction of the arrow VIII of FIG. 5, and omits some of the contour rollers, illustrates the mechanism in greater detail. As will be seen, the cradle 62 is pivotally connected to a shaft 70 carried by a frame 72. The frame 72 comprises side members 74 and 76 which are interconnected by the shaft 70 and a rod 78. A pneumatic piston-cylinder assembly 80 contains a piston (not shown) having a piston rod 82 rotatably connected by a connection 84 to the upper end of the cradle 62. The piston-cylinder assembly 60 (see FIG. 5), has a piston rod 88 connected to the side member 76. In a manner and for purposes to be described, the piston-cylinder assembly 60 moves the frame 72 to and fro in the direction of the arrows B, so as to carry the cradle 62 with it and its contour rollers, while the piston-cylinder assembly 80 pivots the cradle 62 about the axis of the shaft 70 in the directions of the arrows C.

The operation of the robot hand as so far described will now be explained with particular reference to FIGS. 4, 5 and 6.

As already explained, the robot hand 20 is carried at the end of a robot arm (in the manner to be described in more detail below). The robot, which may be a six-axis robot, swings the robot hand 20 to a position where there is a stack of cassettes 22. The robot moves the swinging arm 48 into such position that the claws 50 engage the bore of one of the cassettes in the stack and picks up the cassette in the manner shown in FIG. 5. The robot then swings the robot hand 20 into position over the flange 6 of the door opening 5, so that the rollers 38 and 40 are positioned on opposite sides of the flange as shown in FIG. 5. It will be appreciated that this process is carried out during the normal assembly line manufacture of a motor vehicle body, and each body would automatically be brought to a predetermined position on the track adjacent to the robot. As shown in FIG. 1, the robot hand is positioned between 80 and 90 angular degrees to the direction of the flange.

A short length of sealing strip 8 protrudes from each cassette when picked up. The orientation of the sealing strip within the cassette 22 is such that the open mouth of the splayed-apart channel of the gripping section 10 (FIGS. 2, 3 and 4) faces upwardly, as viewed in FIG. 5. The first stage in the fitting process involves the movement of the cassette 22 generally to the right in the direction of the arrow D as shown in FIG. 5. As shown in FIG. 5, the claws 50 are mounted on a carrier 90 which is slidably mounted on the swinging arm 48 and is slid rightwards in the direction of the arrow D by a pneumatic or electric motor 91 mounted on the arm 48 and driving the carrier 90 through a rack and pinion arrangement 92.

This rightward movement of the cassette moves the protruding end of the sealing strip 8 into the bight between the take-up roller 32 and the free-running roller 34 (FIG. 5). In a manner to be described, motor 30 is then energized and rotates roller 32 in an anti-clockwise direction (as viewed in FIG. 5) so as to pull the sealing strip 8 from the cassette 54. The emerging sealing strip passes over guides 93 and 94 and engages the contour rollers 63 to 68 in that order, these rollers constraining the emerging sealing strip to follow the curved path shown in FIG. 5, the strip passing further free-running guide rollers 96, 98, 96A and 98A.

Distanced by a predetermined distance from its emerging initial end, the sealing strip 8 carries a sensible mark (for example, a white dot) which is sensed by a photocell arrangement 95 (see FIG. 6, for example) guide roller 93. Logic circuitry associated with the Photocell stops the motor 30 (though permits its subsequent free running) when this dot is sensed, the dot being positioned so that the take-up roller 32 drives just sufficient length of emerging sealing strip as is necessary for its initial end to engage the flange 6 as shown at F in FIG. 5. It will be observed that the open splayed-apart mouth of the sealing strip 8 is now engaging the flange 6.

The piston-cylinder 80 (FIG. 8) is now energized so as to pivot the cradle 62 in the direction C as shown in that Figure. Cradle 62 thus moves into the position shown in FIG. 6, with the contour rollers now being moved clear of the sealing strip 8 and so that the cradle 62 is moved away from the flange 6. The contour rollers 63 to 68 are no longer required because the sealing strip 8 is constrained in its curved path (as illustrated dotted in FIG. 5) by virtue of the fact that its end F is engaging the flange. The piston-cylinder assembly 60 is then energized so as to move the frame 72 (FIG. 8) to the right as viewed in that Figure. The cradle 62 thus now has the position shown in FIG. 7 and is completely clear of the flange 6.

Figure 6:
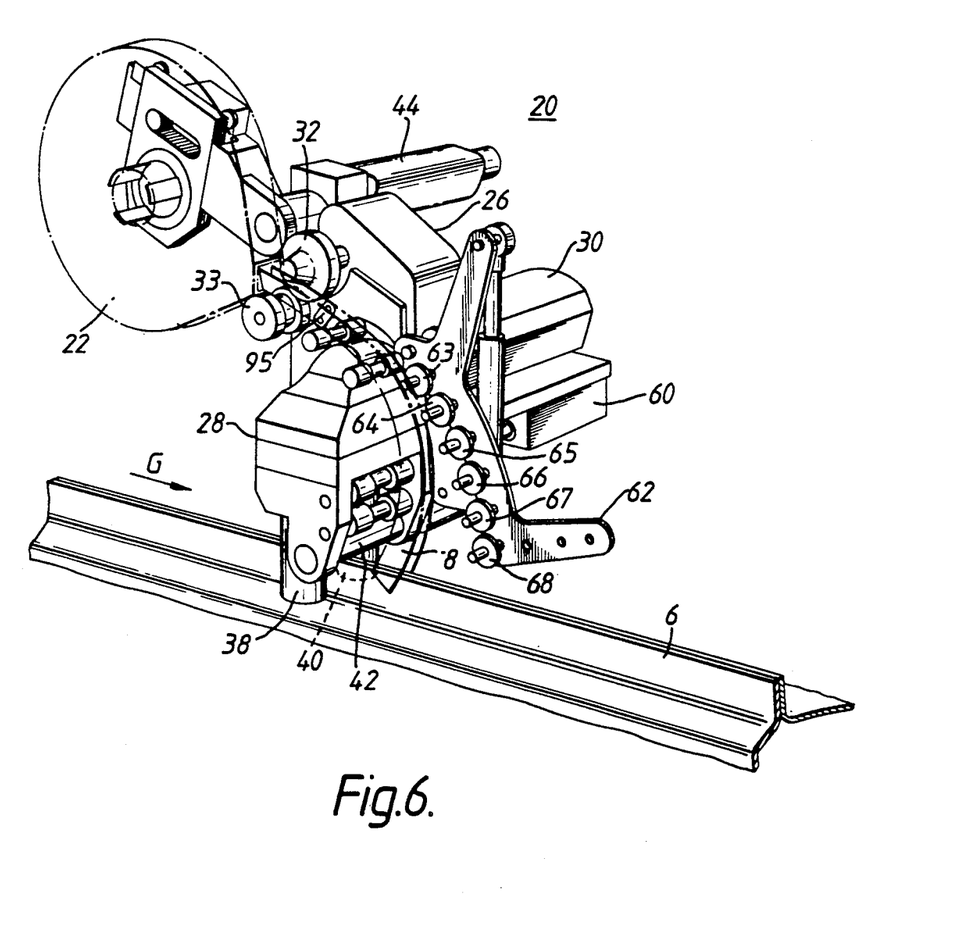
FIG. 6 corresponds to FIG. 5 but shows the robot hand in a later state.

Motor 30 is now caused (in the manner to be explained) to rotate the rollers 38 and 40 and at the same time the robot arm moves the robot hand 20 slightly along the flange as shown by the arrow G in FIG. 6. This movement causes the initial end F of the sealing strip 8 to be laid down upon the flange 6 and to be embraced by the rollers 38 and 40. These rollers are positioned apart by a predetermined distance so that they press the splayed-apart sides of the gripping section 10 towards each other into the configuration shown in FIG. 2. Because these rollers are driven by the motor 30, they continue to move the robot hand 20 to the right, in the direction of the arrow G, thus causing the sealing strip 8 to be continuously drawn out of the cassette 22 and laid upon the flange 6 with its gripping section 10 initially in splayed-apart configuration, the gripping section then being converted into the configuration shown in FIG. 2 by the rotating rollers 38,42. During this process, the robot and the support assembly arm (not shown) cause the robot hand 20 to apply downward pressure onto the sealing strip 8 as it is being mounted on the flange 6, this pressure being applied through the medium of the free-running roller 42. The gripping section 10 is thus properly seated on the flange 6.

Figure 7:
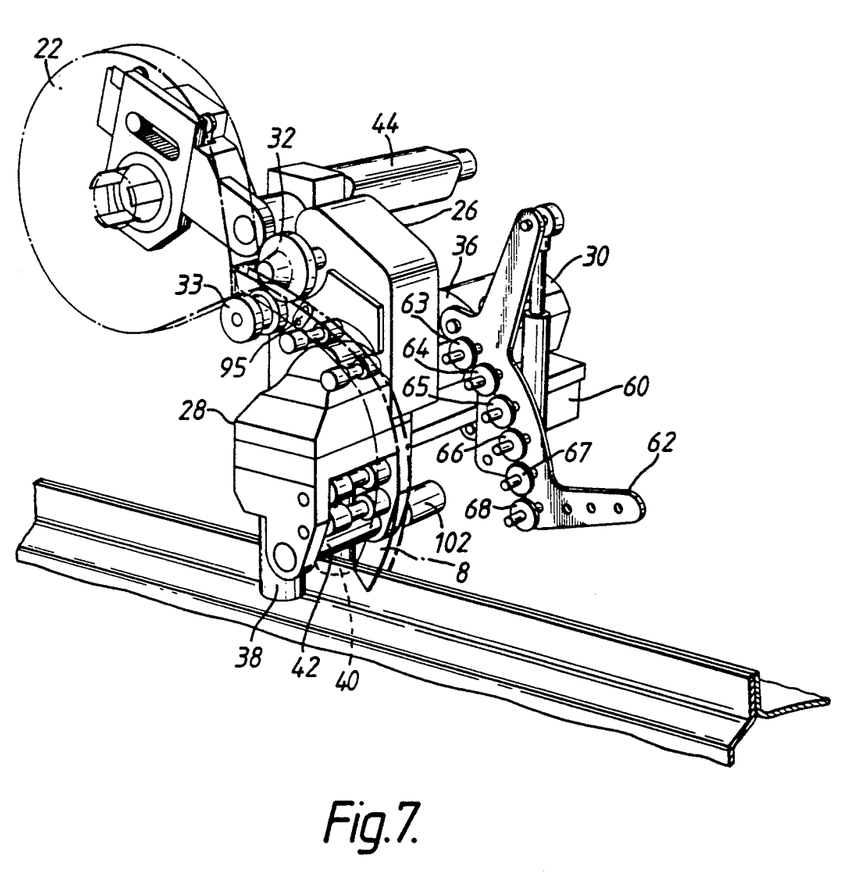
FIG. 7 corresponds to FIGS. 5 and 6 but shows a still later state.

In FIGS. 5, 6, and 7, the sealing strip 8 is illustrated without the sealing section 12 (see FIGS. 2, 3 and 4). However, this would of course be present and the roller 40 would apply side pressure to the corresponding splayed-apart side wall of the channel of the gripping section 10 via the sealing section 12.

The free running roller 42 drives a tachometer 102 (see FIGS. 10 and 11) which thus produces an output dependent on its rotational speed which is a measure of the speed of movement of the robot hand 20 along the flange 6. A signal corresponding to this speed is fed to the control mechanism for the robot itself so that the robot can match the movement of its arm to the actual movement of the robot hand along the flange.

The process continues until the full length of the Sealing strip 8 has been laid on the flange. When the final end of the sealing strip passes over the photocell 95, it is sensed and causes the motor 30 to cease rotating the rollers 38 and 40 at a predetermined later instant which is such that the final end of the emerging sealing strip will have been laid on the flange. A corresponding signal is fed to the control for the robot itself so that the robot movement ceases. The robot then lifts the robot hand 20 clear of the body ready for a repeat of the process described on the next vehicle body arriving on the assembly track.

The manner in which the motor 30 drives the take-up roller 32 and the drive rollers 38 and 40 will now be described with reference to FIGS. 9 and 10.

Figure 9:
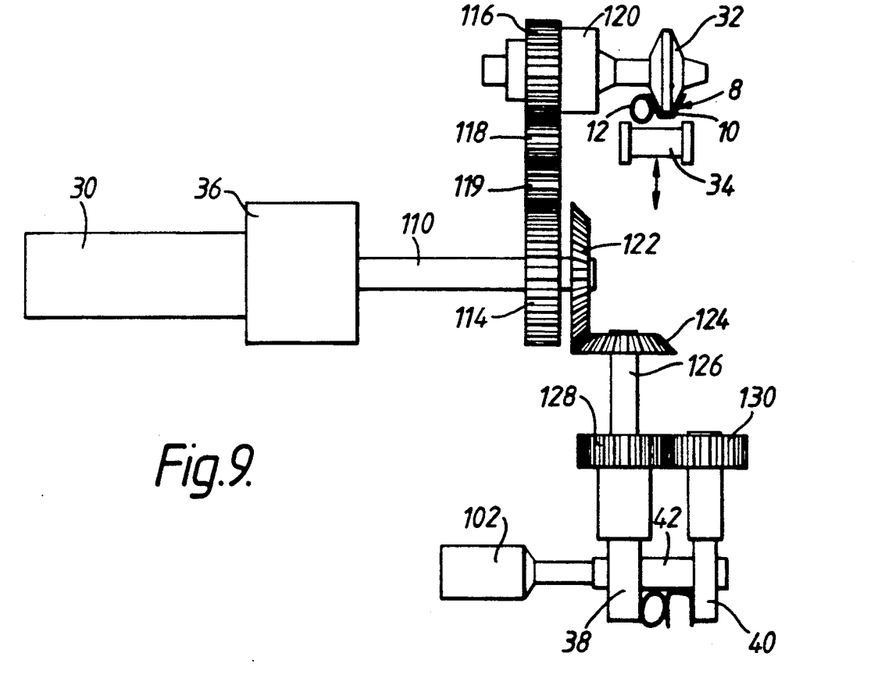
FIG. 9 shows the gear train within the robot hand.

Referring to FIG. 9, motor 30 drives a shaft 110 via the gearbox 36. Shaft 110 is rigid with a gear 114 which rotates a gear 116 via intermediate gears 118 and 119. Gear 116 drives take-up roller 32 via a free wheel unit 120. As shown in diagrammatic form in FIG. 9, the sealing strip 8 is positioned in the bight between the take-up roller and the free-running roller 34, FIG. 9 showing the gripping section 10 and the sealing section 12 of the sealing strip.

Shaft 110 is also rigid with a crown gear 122 engaging a second crown gear 124 driving a shaft 126. Shaft 126 drives the drive roller 38 and, through the intermediary of gears 128 and 130, the other drive roller 40.

FIG. 9 also shows the free-running top roller 42 and the tachometer 102 connected to it, although these are not part of the gear train being described.

When motor 30 is first energized, it drives the take-up roller 32 in the anti-clockwise direction as viewed in FIG. 5, and in this way drives the emerging initial end of the sealing strip 8 along the curved path towards the flange 6 in the manner described above. This rotation of motor 30 also causes rotation of the drive rollers 38 and 40. However, the latter rotation is of no effect because they are clear of the flange 6 and the sealing strip has not yet become positioned between them.

In the manner already described, the photocell 95 stops the motor 30 when the end F of the sealing strip has reached the flange 6 (FIG. 5). Motor 30 is then reversed. Because of the free wheel unit 120, it no longer rotates the take-up roller 32, although the latter is now free to rotate as the sealing strip 8 is continued to be drawn from the cassette 22 by virtue of movement of the robot hand along the flange (in the manner described). The reversed movement of the motor 30 causes the rollers 38 and 40 to rotate in the correct rotary directions to drive the robot hand 20 in the direction of the arrow G (FIG. 5). During the initial motion of motor 30, rollers 38 and 40 clearly rotate in the opposite directions to these "correct" directions; however, this is immaterial because rollers 38 and 40, being clear of the sealing strip at this time, have no effect.

Figure 10:
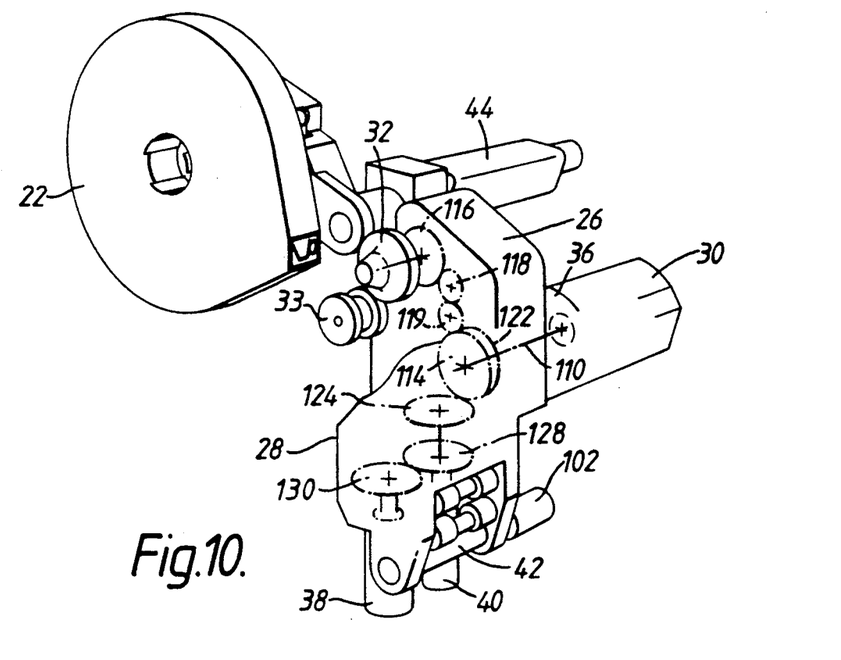
FIG. 10 is a diagrammatic view of the robot hand but showing the gear train of FIG. 9 in phantom form and with other parts omitted.

FIG. 10 illustrates how the gears referred to in FIG. 9 are arranged within the casings 26 and 28.

As the robot hand 20 travels around the door opening, its orientation will have to change at each end or corner in the opening. At the points indicated at J,K,L,M and N in FIG. 1 the robot hand is caused to turn angularly by an appropriate distance (90 degrees in the case of points J,K and N), turning about the sixth axis of the robot which is aligned with the centre of the radius of the particular bend or corner.

Figure 11:
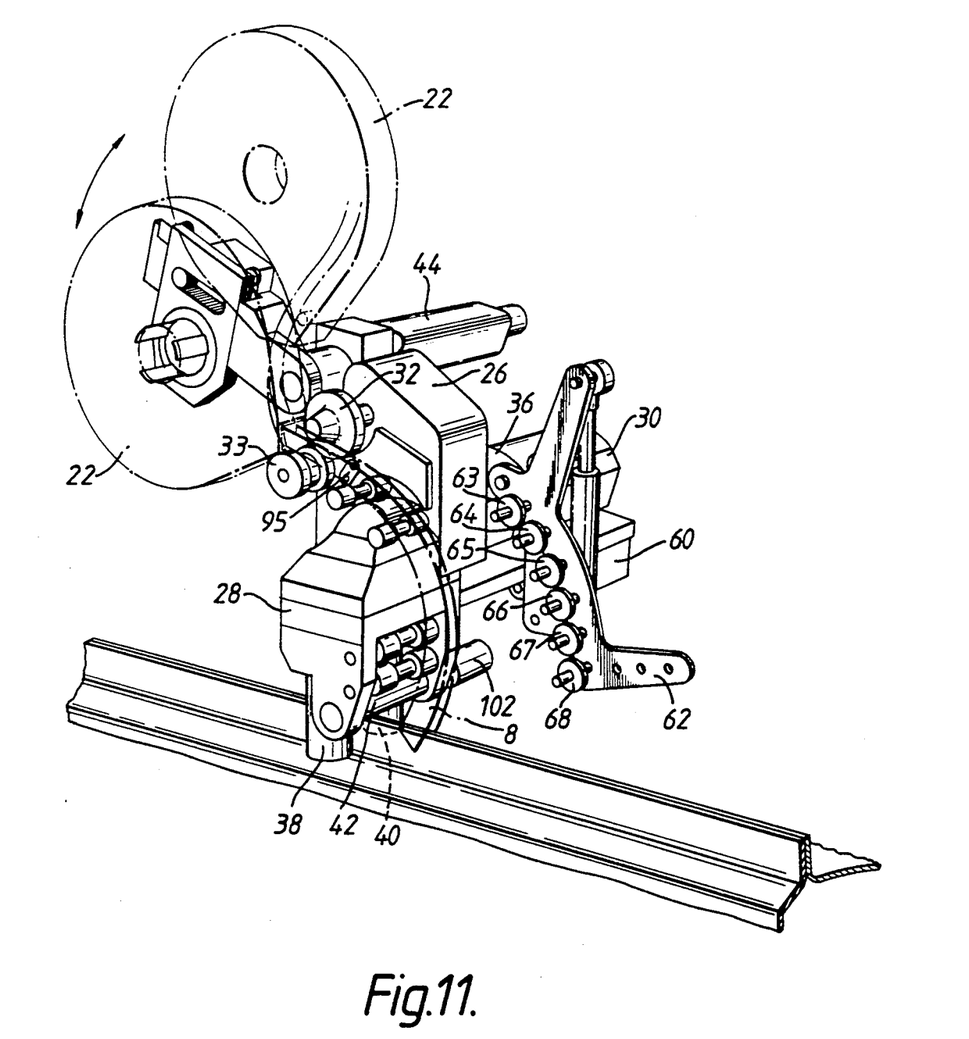
FIG. 11 shows the robot hand and illustrates it at another stage during the fitting process.

As the robot hand travels around the door opening, it is also necessary to ensure that the cassette 22 does not interfere with the door opening itself or other adjacent body parts. In order to assist in this, motor 44 can be energized at appropriate points in the movement around the door opening to adjust the position of the cassette by turning the swing arm 48, as shown in FIGS. 1 and 11. In addition, the carrier 90 (FIG. 5) can be slid in the direction D and in the reverse direction for the same purpose.

Figure 12:
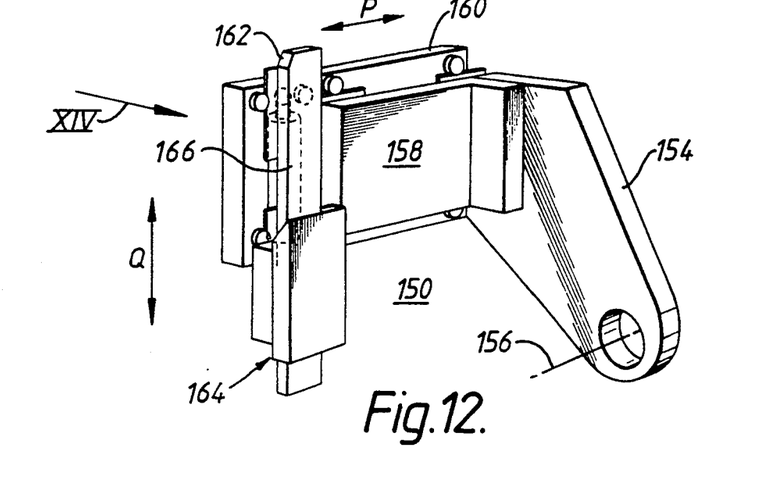
FIG. 12 illustrates a support assembly by means of which the robot hand can be attached to the robot arm.
Figure 13:
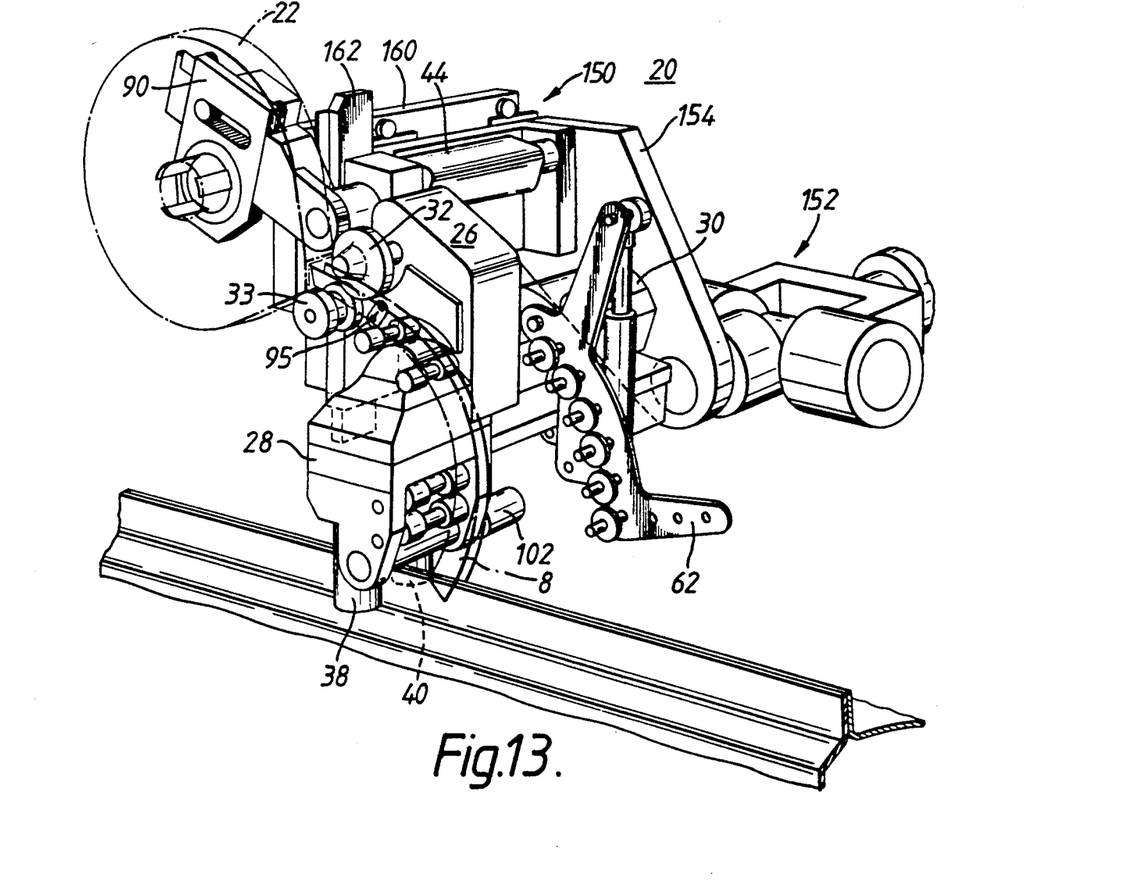
FIG. 13 shows how the support assembly of FIG. 12 is fitted to the robot hand.

FIG. 12 shows the support assembly 150 which is fitted to the end of the robot arm 152 (FIG. 13). The support assembly comprises a member 154 which is rigid with the arm 152 and can be angularly turned by the arm about an axis 156 (the robot's sixth axis). Member 154 is rigid with a first support plate 158 which is attached to a second support plate 160. The plates 158 and 160 are linked together by resilient shock absorbing means (not shown) which permits relative movement between the two plates in the directions indicated at P by plus and minus 12 millimetres. Plate 160 rigidly supports a vertical pillar 162 carrying the robot hand holder 164. The latter is slidable relative to the member 162 in the directions Q within a range of plus and minus 40 millimetres.

Figure 14:
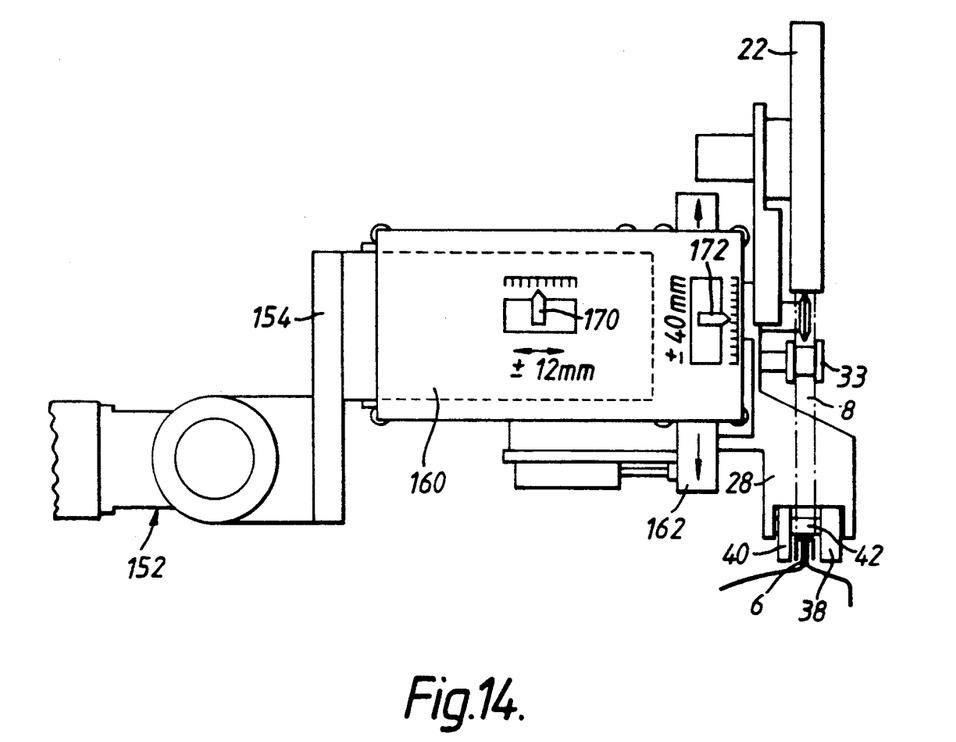
FIG. 14 shows a side view of the support assembly of FIG. 12 looking in the direction of the arrow XIV of FIG. 12.

FIG. 13 shows how the support assembly 150 is actually attached to the robot hand itself. The limited ranges of movement in the directions P and Q permit some lattitude in the programming of the robot's movements and enable account to be taken of the inevitable tolerances in the dimensions of the vehicle body and its positioning on the assembly track. Thus, the robot could be programmed to move the robot hand in a series of straight lines, corresponding to the approximately straight lengths of the flange, with any deviations in the flange from actual straight lines being accommodated by the limited ranges of movement in the directions P and Q. FIG. 14, which is a view looking in the direction of the arrow XIV of FIG. 12 but with the support assembly 150 fitted to the robot hand 20, shows how the support assembly 150 may carry pointers 170,172 to indicate the amount of relative movement in the directions P,Q (FIG. 12), as a programming aid.

As the robot carries the robot hand around the door opening, it applies a substantially constant pressure to the outside of the base of the channel of the gripping section of the sealing strip 8 (via the top roller 42, see FIG. 5). Fitting of the sealing strip to the flange normally starts along the bottom of the door opening (between points J and K in FIG. 1) and the exerted pressure is approximately 4 bar. This pressure is maintained as the robot hand travels around the door opening and the robot therefore has to take account of the changing effect of the weight of the robot hand itself. A constant thrust unit 166 (see FIG. 12), acting between the member 162 and the robot hand support 164, helps to maintain this constant pressure.

Figure 15:
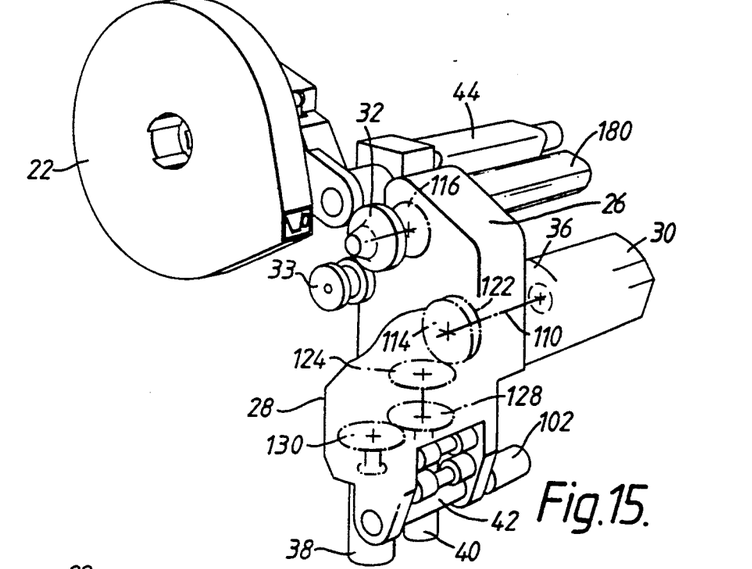
FIGS. 15 and 16 correspond to FIGS. 10 and 13 respectively but show a modified construction.
Figure 16:
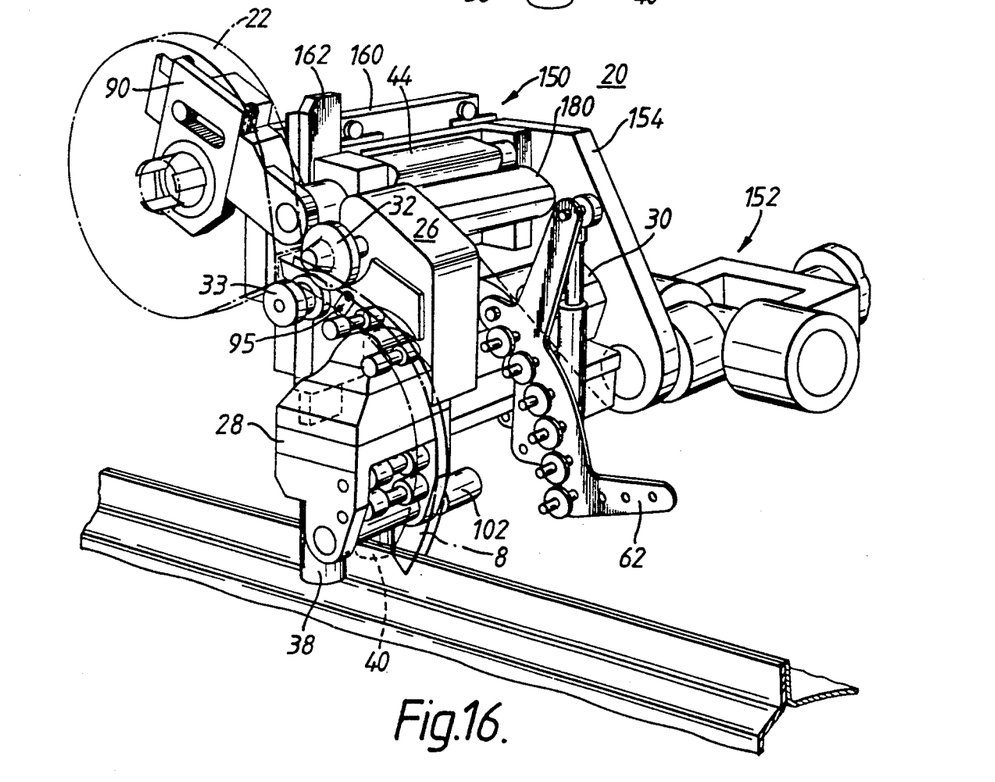

FIGS. 15 and 16 correspond to FIGS. 10 and 13 respectively and show a modification. The modification comprises the provision of an additional electric motor 180 which is connected to drive the roller 32, and the removal of the connections via gears 118 and 119 (see FIG. 10) between motor 30 and roller 32. Thus, in the modified arrangement the drive to the rollers 38 and 40 on the one hand and the drive to the roller 32 on the other hand are completely separate and are derived from separately controllable motors 30 and 180 respectively. The operation is otherwise the same.

What is claimed is:

1. A robot arrangement for fitting a length of channel-shaped strip onto a mounting flange, the strip having an initial end and a final end and with channel side walls and a channel base extending longitudinally between those ends, the channel side walls defining a mouth for the channel and the side walls of the channel being initially splayed apart, the robot arrangement comprising a body part, means on the body part for supporting the sealing strip with its side walls initially splayed apart and so that the sealing strip is longitudinally movable, constraining means on the body part and defining a predetermined curved path having an input end and a distal end, the input end being positioned to receive the initial end of the strip and the immediately following initial part of the length of the strip, the initial end and the initial part of the length of the strip following the curved path as the strip moves longitudinally, the mouth of the channel facing outwardly of the curved path, supporting means for positioning the body part in juxtaposition with the flange so that the mouth of the channel of the strip emerging from the distal end of the curved path embraces the flange, at least two drive rollers mounted on the body part adjacent the distal end of the curved path and rotatable about parallel axes spaced apart by such distance as to receive the strip between them, motor means on the body part for rotating the rollers in such predetermined directions that they draw the strip longitudinally along the curved path and onto the flange, pressing the side walls into gripping engagement with the sides of the flange and driving the body part along the flange, and transporting means on the body part and connected to the constraining means to move the constraining means clear of the curved path when the initial end of the strip emerging from the distal end of the curved path embraces the flange.

2. An arrangement according to claim 1, in which the constraining means comprises a member carrying at least one guide roller, the member being mounted for pivotal movement on the body part so as to pivot the at least one guide roller into and out of engagement with the strip in the curved path and also being mounted for translational movement in a direction transverse to the curved path.

3. An arrangement according to claim 2, in which the transporting means includes piston-cylinder means connected to the member for causing the said pivotal and translational movement thereof.

4. An arrangement according to claim 1, in which the strip is initially stored in a coil thereof of predetermined length in a cassette, and including means on the body part for supporting the cassette and permitting dispensing of the strip therefrom.

5. An arrangement according to claim 4, including motor means carried by the body part for adjusting the position of the cassette thereon.

6. An arrangement according to claim 5, in which the motor means is capable of adjusting the position of the cassette in two transverse direction.

7. An arrangement according to claim 5, including initial drive means for engaging the initial end of the strip protruding from the cassette and for feeding the end into and along the curved path, and energizable to cause the initial end of the strip to be fed to the distal end of the curved path.

8. An arrangement according to claim 7, in which the initial drive means comprises motor means mounted on the body part.

9. An arrangement according to claim 8, in which the initial drive means comprises a take-up roller for engaging the strip.

10. An arrangement according to claim 9, including sensing means on the body part and positioned relative to the take-up roller to sense passage of the strip therepast and to control the motor means of the initial drive means to drive the take-up roller through a predetermined amount of angular movement, the predetermined amount of angular movement feeding the initial end of the strip to the distal end of the curved path.

11. An arrangement according to claim 10, in which the motor means of the initial drive means is the same as the motor means for rotating the drive rollers.

12. An arrangement according to claim 11, including
free wheel means interposed between the motor means and the take-up roller, whereby the motor means drives the take-up roller through the said predetermined amount of angular movement via the free wheel means and simultaneously rotates the drive rollers in directions opposite to the said predetermined directions, and
means mounted on the body part for responding to the completion of the predetermined amount of angular movement by causing the motor means to reverse and to rotate the drive rollers in the said predetermined directions, the free wheel means preventing the reversed motor means from driving the take-up roller means and permitting free-wheeling of the take-up roller means in response to subsequent passage of the strip along the said path.

13. An arrangement according to claim 1, including a further roller mounted adjacent to the drive rollers but rotatable about an axis transverse thereto so as to engage the strip on the mounting flange and to be driven by such engagement as the robot arrangement moves along the flange and lays the strip thereon.

14. An arrangement according to claim 1, in which the supporting means is carried by a robot.

15. An arrangement according to claim 14, including a further roller mounted on the body part and adjacent to the drive rollers but rotatable about an axis transverse thereto so as to engage the strip on the mounting flange and to be driven by such engagement as the robot arrangement moves along the flange and lays the strip thereon, and
speed measuring means on the body part for measuring the speed of rotation of the further roller and controlling the robot to move the robot arrangement along the mounting flange at a corresponding speed.

16. An arrangement according to claim 1, in which the supporting means permits a predetermined degree of limited movement between itself and the body part to accommodate robot programming tolerances and dimensional tolerances in the position of the mounting flange.

17. An arrangement according to claim 16, including indicating means on the supporting means for indicating the extent of such limited movement at any time.

18. A robot hand for fitting a length of channel-shaped strip onto a longitudinally extending mounting flange around an opening on a motor vehicle body positioned in a predetermined location with reference to a vehicle body assembly track, the strip having an initial end and a final end and with channel side walls and a channel base extending longitudinally between them, the channel side walls defining a channel mouth and the side walls of the channel being initially splayed apart, the robot hand comprising
a body part in the form of a housing supported and positionally controlled by a robot so as to be juxtaposed with the opening on the vehicle body,
means on the housing for receiving and supporting a cassette containing a predetermined coiled length of the strip matching the length of the mounting flange and the initial end of which strip protrudes from the cassette,
constraining means on the housing defining a predetermined curved path having an input end and a distal end,
take-up means for receiving the initial end of the strip protruding from the cassette and driving the strip along the predetermined curved path from its input end to its distal end until the initial end of the strip reaches the distal end of the curved path and with the mouth of the channel of the strip facing outwardly of the curved path so that the initial end of the strip embraces the flange when the housing is positionally controlled by the robot so that the distal end of the curved path is located immediately adjacent the flange,
two drive rollers mounted on the housing adjacent the distal end of the predetermined curved path so that each frictionally engages the outside of a respective one of the splayed apart side walls of the strip,
drive means for rotating the drive rollers in such predetermined directions that their frictional engagement with the side walls of the strip pulls the sealing strip from the cassette and along the curved path and onto the flange and moves the housing along the flange, the separation between the rollers being such that they press the splayed apart side walls into gripping engagement with the flange, and
transporting means on the housing and connected to the constraining means to move the constraining means clear of the curved path when the initial end of the strip emerging from the distal end of the curved path embraces the flange.

19. A robot hand according to claim 18, in which the constraining means includes at least one movable guide roller for contacting and guiding the strip.

20. A robot hand according to claim 18, including means positioned relative to the take-up means for optically sensing the passage therepast of the initial end of the strip and controlling the take-up means to cease driving the strip when the initial end reaches the distal end of the curved path.

21. A robot hand according to claim 18, in which the take-up means includes a take-up roller, and in which the drive means comprises rotary motor means carried by the housing and connected to rotate the drive rollers and also connected to rotate the take-up roller, the connection to the take-up roller being through free-wheel means whereby rotation of the motor in one rotary direction rotates the take-up roller through the free-wheel means in such sense as to drive the initial end of the strip along the curved path, and rotation of the motor in the opposite direction rotates the drive rollers in the said predetermined direction but is prevented by the free-wheel means from rotating the take-up roller, the take-up roller being permitted by the free-wheel means to free-wheel in response to subsequent passage of the sealing strip along the said path.

22. A robot hand according to claim 18, including further motor means for moving the cassette relative to the housing so as to re-position it clear of any obstruction on the vehicle body adjacent the opening.

* * * * *